(12) United States Patent
Shudo

(10) Patent No.: US 8,515,173 B2
(45) Date of Patent: Aug. 20, 2013

(54) IMAGE PROCESSING SYSTEM, IMAGE PROCESSING METHOD AND COMPUTER READABLE MEDIUM

(75) Inventor: Hiroaki Shudo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 965 days.

(21) Appl. No.: 12/555,432

(22) Filed: Sep. 8, 2009

(65) Prior Publication Data

US 2010/0239167 A1    Sep. 23, 2010

(30) Foreign Application Priority Data

Mar. 23, 2009 (JP) .................................. 2009-070926

(51) Int. Cl.
*G06K 9/34* (2006.01)
(52) U.S. Cl.
USPC .......................................................... 382/180
(58) Field of Classification Search
None
See application file for complete search history.

(56) References Cited

U.S. PATENT DOCUMENTS

| 5,689,585 | A | * | 11/1997 | Bloomberg et al. | .......... 382/229 |
| 5,991,276 | A | | 11/1999 | Yamamoto | |
| 6,222,583 | B1 | * | 4/2001 | Matsumura et al. | .......... 348/113 |
| 2003/0174160 | A1 | * | 9/2003 | Deutscher et al. | ............ 345/716 |
| 2008/0116255 | A1 | | 5/2008 | Hilbert et al. | |

FOREIGN PATENT DOCUMENTS

| JP | 05-020429 A | 1/1993 |
| JP | 05-094535 A | 4/1993 |
| JP | 05-135171 A | 6/1993 |
| JP | 09-162996 A | 6/1997 |
| JP | 10-150647 A | 6/1998 |
| JP | 2000-224559 A | 8/2000 |
| JP | 2001-312489 A | 11/2001 |
| JP | 2005-252811 A | 9/2005 |
| JP | 2007172281 A | 7/2007 |
| JP | 2008-130079 A | 6/2008 |

OTHER PUBLICATIONS

Japanese Office Action, dated Jan. 11, 2011, issued in Application No. 2009-070926.

* cited by examiner

Primary Examiner — Alex Liew
(74) Attorney, Agent, or Firm — Sughrue Mion, PLLC

(57) ABSTRACT

An image processing system includes a label image assigning unit and an image output unit. The label image assigning unit respectively assigns label images, each label image corresponding to each of address terms of image elements, to each position corresponding to each of the image elements in an object image, with respect to each of the image elements contained in the object image, the object image acquired as an object to be viewed by a plurality of viewers. The image output unit outputs an assigned image in which the label images are assigned to the object image.

15 Claims, 5 Drawing Sheets

IMAGE PROCESSING SYSTEM, IMAGE PROCESSING METHOD AND COMPUTER READABLE MEDIUM

CROSS-REFERENCE TO RELATED APPLICATIONS

This application is based on and claims priority under 35 USC 119 from Japanese Patent Application No. 2009-070926 filed on Mar. 23, 2009.

BACKGROUND

1. Technical Field

The invention relates to an image processing system, an image processing method and a computer readable medium 2. Related Art In accordance with the development of communication tools, technologies for distributing images to remote communication destinations, for example, such as a remote meeting system, have appeared. In accordance with such a technology, an image transmitted from a system is displayed on both of the system and one system as a transmission destination, which allows plural viewers at remote positions to view the same image. Further, there is also proposed an image display apparatus for allowing plural viewers at a same location to view an image at the same time, such as an image projecting apparatus that projects an image on a screen.

SUMMARY

According to an aspect of the invention, an image processing system includes a label image assigning unit and an image output unit. The label image assigning unit respectively assigns label images, each label image corresponding to each of address terms of image elements, to each position corresponding to each of the image elements in an object image, with respect to each of the image elements contained in the object image, the object image acquired as an object to be viewed by a plurality of viewers. The image output unit outputs an assigned image in which the label images are assigned to the object image.

BRIEF DESCRIPTION OF THE DRAWINGS

Exemplary embodiments of the invention will be described in detail based on the following figures, wherein.

DETAILED DESCRIPTION

Hereinafter, an exemplary embodiment of the invention will be described with reference to the drawings.

Figure 1:
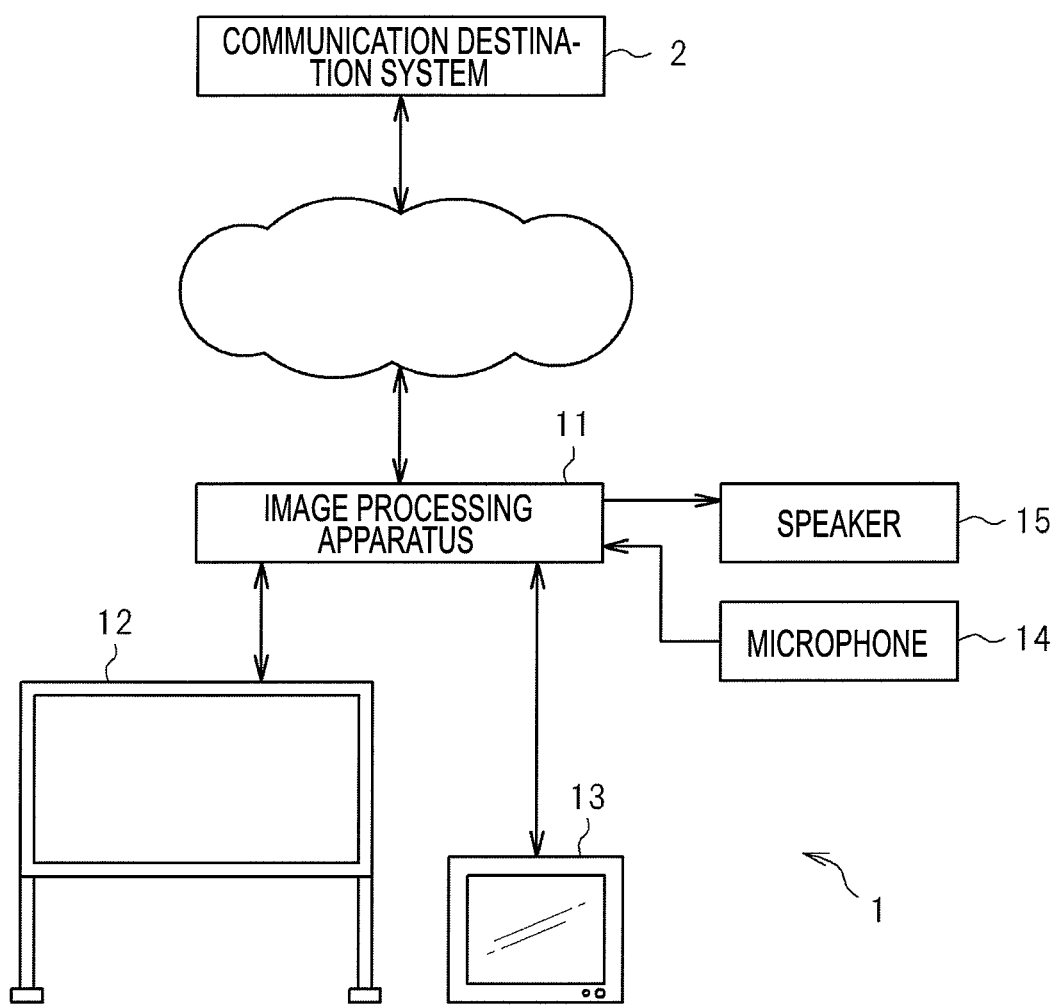
FIG. 1 is a schematic diagram of an example of an image processing system according to an exemplary embodiment of the invention.

FIG. 1 is a diagram showing an overview of an example of an image processing system 1 according to an exemplary embodiment of the invention. The image processing system 1 according to this exemplary embodiment is configured of an image processing apparatus 11, an image display apparatus 12, an operation panel 13, a microphone 14, and a speaker 15. Further, the image processing system 1 is connected to communicate with an image processing system (hereinafter called communication destination system 2) installed in a separate location via a communication tool such as a LAN or the Internet. Note that the communication destination system 2 may be an image processing system having the same configuration as the image processing system 1, or may have a system configuration different from that of the image processing system 1.

Hereinafter, a location in which the image processing system 1 is installed is mentioned as site A, and a location in which the communication destination system 2 is installed is mentioned as site B. Further, a user using the image processing system 1 at the site A is mentioned as user Ua, and a user using the communication destination system 2 at the site B is mentioned as user Ub. In this exemplary embodiment, the image processing system 1 and the communication destination system 2 are connected to communicate with one another to transmit and receive image and speech information, which allows realizing a remote meeting between the user Ua and the user Ub. Note that plural users may attend a meeting at the same time at both of the site A and the site B.

Figure 2:
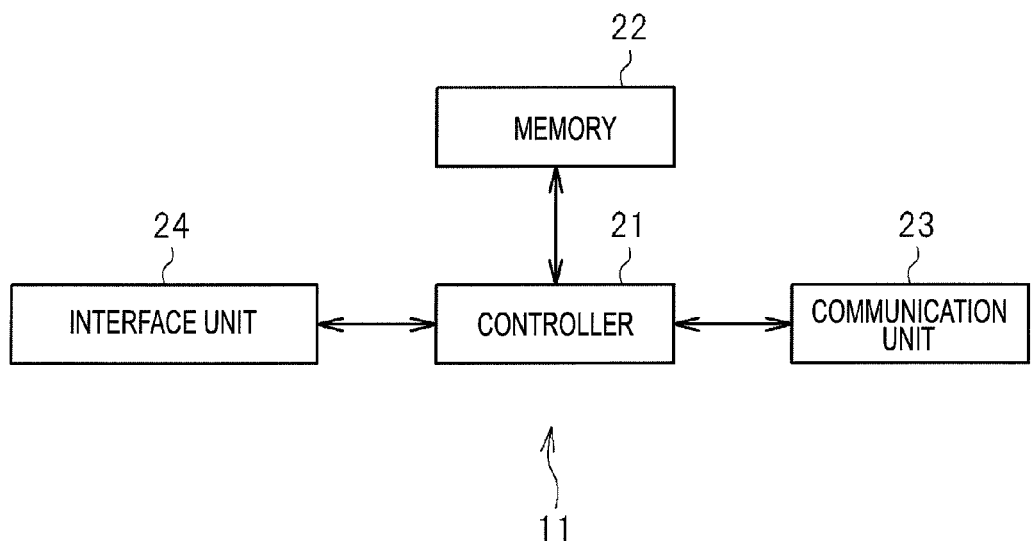
FIG. 2 is a diagram showing an example of a configuration of an image processing apparatus according to the exemplary embodiment of the invention.

The image processing apparatus 11 is, for example, a personal computer or the like, and as shown in FIG. 2, the image processing apparatus 11 is configured of a controller 21, a memory 22, a communication unit 23, and an interface unit 24.

The controller 21 is configured of a CPU and the like, and executes various types of information processings in accordance with a program stored in the memory 22. A specific example of the processings executed by the controller 21 in this exemplary embodiment will be described later. The memory 22 is configured of a RAM, a ROM, a hard disk, and the like, and maintains a program executed by the controller 21, and various types of data. Further, the memory 22 also operates as a working memory for the controller 21.

The communication unit 23 is a communication interface, for example, such as a LAN card, and relays data transmitting/receiving between the image processing apparatus 11 and other communication devices via a communication tool such as a LAN or the Internet. In this exemplary embodiment, image and speech data are transmitted to/received from the communication destination system 2 via the communication unit 23.

The interface unit 24 relays transmitting/receiving of information to and from the controller 21, the image display apparatus 12 and the operation panel 13, the microphone 14, and the speaker 15. In detail, the interface unit 24 outputs picture signals showing images to be respectively displayed on the image display apparatus 12 and the operation panel 13 according to instructions from the controller 21. Thereby, the image processing apparatus 11 displays various types of images on the respective display screens of the image display apparatus 12 and the operation panel 13. Further, the interface unit 24 outputs information on an operation by a user respectively input from the image display apparatus 12 and the operation panel 13, to the controller 21. Further, the interface unit 24 outputs a speech signal input from the microphone 14 to the controller 21, and outputs a speech signal to the speaker 15 according to an instruction of the controller 21.

The image display apparatus 12 displays an image corresponding to a picture signal input from the image processing apparatus 11 on its display screen. An object to be displayed by the image display apparatus 12 is, for example, a document image prepared by use of an application program to prepare a document for presentation. In this exemplary embodiment, an image displayed on the image display apparatus 12 is transmitted from the image processing apparatus 11 to the communication destination system 2 by a technology such as Virtual Network Computing (VNC), and is also displayed on an image display apparatus in the communication destination system 2. Thereby, the user Ua and the user Ub hold a meeting while viewing the same image. Note that, hereinafter, an image which is shared with the communication destination system 2 and is an object to be viewed by plural viewers who are the user Ua and the user Ub, is called an object image I.

Further, the image display apparatus 12 may have a function of sensing a position on its display screen which a pen or the like touches, to output information showing the position to the image processing apparatus 11. In this case, the image processing apparatus 11 updates the object image I currently displayed on the display screen to an image on an appending image showing a locus along which a pen or the like moves is superimposed on an original document image in accordance with the positional information. Thereby, when the user Ua carries out an operation of moving a pen on the display screen as if writing a memo on a whiteboard, the object image I to which the content of the memo is added is displayed on the display screen. Note that sensing of a position on the display screen which a pen or the like touches may be realized by various types of systems such as a pressure-sensitive sensor disposed so as to be overlapped on the display screen or a light-sensitive device optically sensing a position of a body.

The operation panel 13 is an operating device used in order for the user Ua to input various types of instructions to the image processing apparatus 11. In this exemplary embodiment, the operation panel 13 is a touchscreen, and displays an image such as a menu screen output from the image processing apparatus 11 on its display screen, and outputs information on an operation instruction input due to the user Ua touching the display screen with his/her fingers, to the image processing apparatus 11. Note that the image processing system 1 according to this exemplary embodiment may include other user interface devices, for example, such as a display device and a mouse, a keyboard, and the like, in place of the operation panel 13.

The microphone 14 collects surrounding speech, and outputs a speech signal thereof to the image processing apparatus 11. A voice uttered by the user Ua is collected by the microphone 14. In detail, in this exemplary embodiment, in a remote meeting, in a state in which the object image I is displayed on the image display apparatus 12, the user Ua speaks about the object image I. The microphone 14 outputs speech information obtained by collecting the voice of the user Ua to the image processing apparatus 11. This speech information is transmitted to the communication destination system 2 by the image processing apparatus 11, and is output as speech of the user Ua at the site B from a speaker provided to the communication destination system 2.

The speaker 15 reproduces the speech according to the speech signal output from the image processing apparatus 11. In this exemplary embodiment, a voice uttered by the user Ub at the site B is collected by a microphone in the communication destination system 2, and is transmitted from the communication destination system 2 to the image processing apparatus 11. The speaker 15 reproduces the speech of the user Ub.

Figure 3:
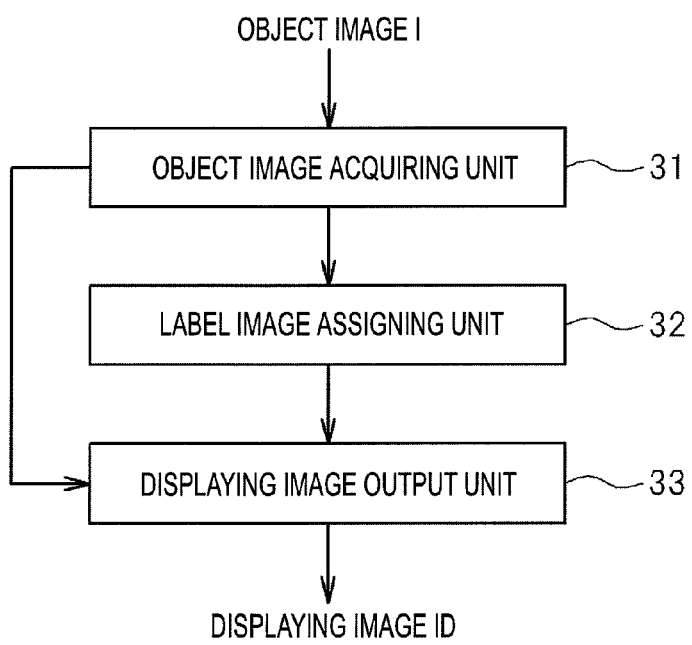
FIG. 3 is a functional block diagram showing an example of functions realized by the image processing apparatus according to the exemplary embodiment of the invention.

Hereinafter, the functions realized by the image processing apparatus 11 according to this exemplary embodiment will be described. As shown in FIG. 3, the image processing apparatus 11 is functionally configured of an object image acquiring unit 31, a label image assigning unit 32, and a displaying image output unit 33. These functions are realized due to the controller 21 of the image processing apparatus 11 executing the program stored in the memory 22. This program may be provided via a communication tool such as the Internet, or may be stored in various types of computer-readable information storage media such as optical disks and the like, to be provided.

The object image acquiring unit 31 acquires the object image I serving as an object to be viewed by plural viewers. As a specific example, the object image acquiring unit 31 reads out presentation data or the like containing the object image I from an information storage medium such as a memory card according to an instruction of the user Ua, to acquire the object image I. Or, the object image acquiring unit 31 may be configured to receive presentation data or the like from another server computer or the like connected thereto via a communication tool, to acquire the object image I.

The label image assigning unit 32 assigns label images M denoting address terms of the image elements C to positions corresponding to the image elements C of the object image I with respect to respective image elements C contained in the object image I acquired by the object image acquiring unit 31. In detail, first, the label image assigning unit 32 performs an image analysis on the object image I, and specifies respective positions and sizes of the image elements C contained in the object image I.

Here, the image elements C mean semantically collective image constitutional units, that occupy a given range in the object image I. As a specific example, the image elements C may be figures, tables, pictures, photographs, and the like contained in the object image I, or may be character strings (i.e., sentences or paragraphs) consecutively arrayed.

Specifying of such image elements C contained in the object image I is realized by various types of methods. For example, when the object image I is an image showing the content of a document, the label image assigning unit 32 may specify the constituent factors of the document (chapters and sections, diagrams, reference documents, and the like) as image elements C to make the label images M correspond thereto, on the basis of a result of a structural analysis on a document. As a specific example of the structural analysis on a document, a technique of performing a structural analysis by use of chapter numbers, figure numbers, and the like contained in document data is disclosed in, for example, JP-A-2001-312489. Further, in JP-A-5-94535, a technique of performing a structural analysis on a document by use of blank areas (white fields) contained in an image is disclosed. Further, when data denoting the object image I is structured document data (for example, an HTML file or the like), the label image assigning unit 32 may extract paragraphs, diagrams, pictures, and the like, which are specified by tags contained in the structured document data, as image elements C.

Further, the label image assigning unit 32 may demarcate the image elements C contained in the object image I by use of publicly-known T/I (Text/Image) separating processing, a boundary detection technology for respective image elements as disclosed in JP-A-5-135171, a pattern matching technology for image elements as disclosed in JP-A-5-020429, or the like.

After image elements C contained in the object image I are specified by a method as described above, the label image assigning unit 32 assigns label images M denoting address terms of the image elements C to positions corresponding to the image element C in the object image I with respect to the specified respective image elements C. As a specific example, the label images M may be images denoting numbers such as "1," "2," "3," and . . . , characters such as "A," "B," "C," and . . . , or various types of marks. The label images M are assigned so as to correspond to the respective image elements C contained in the object image I, and to be different from each other. Provided that the users Ua and Ub speak about the image elements C while calling the respective image elements C by their address terms denoted by the label images M, it is possible for the users Ua and Ub to communicate with each other without misunderstanding on which part of the image is currently the issue, and the discussion on the object image I is smoothly held.

As already described, each of the respective label images M is disposed at a position corresponding to an image element C designated by the label images M in the object image I. Here, the corresponding position may be a position in the vicinity of the image element C and in a given direction to the image element C, or may be set to a position in the vicinity of the image element C, and which is relatively separated away from the other image elements C. In order to clarify such a corresponding relationship between a label image M and an image element C, an image, for example, such as a lead line to connect a label image M and an image element C designated by the label image M may be disposed.

Figure 4:
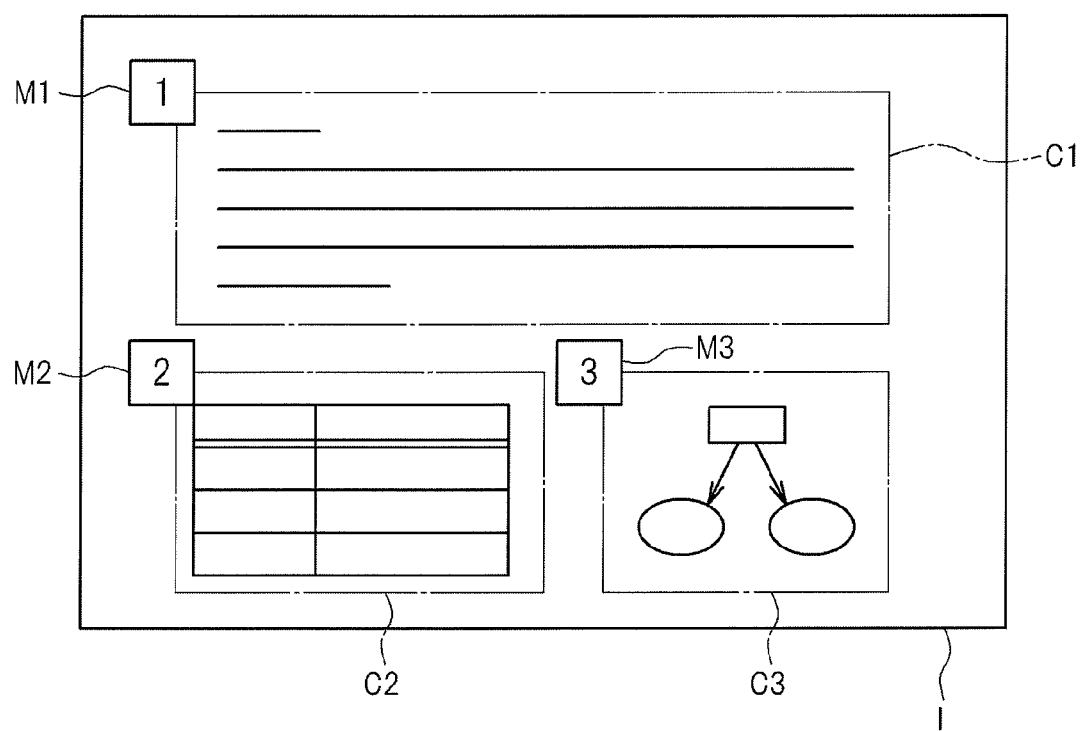
FIG. 4 is a diagram showing an example of an object image assigned with label images.

FIG. 4 is a diagram showing an example of the object image I assigned with label images M. In the example of the drawing, a label image M1 configured of a numeral "1" and an enclosure line enclosing the numeral is made to correspond to character strings (an image element C1) disposed at the upper half of the object image I. Further, a label image M2 containing a numeral "2" and a label image M3 containing a numeral "3" are respectively made to correspond to a table (an image element C2) disposed at the lower left and a figure (an image element C3) disposed at the lower right.

Note that the label image assigning unit 32 may be configured to assign a sign of a type different from that of a sign already existing in the object image I as a label image M to the object image I. For example, at the time of specifying the image elements C contained in the object image I, when numbers (numerals) denoting diagrams or chapters are detected by image processing such as pattern matching, the label image assigning unit 32 is to use an image showing a sign of a type (alphabet, mark, or the like) different from the numbers as a label image M. In this way, when the users Ua and Ub hold a discussion by use of an address term denoted by a label image M, it is possible to avoid a state in which the image element C designated by the address term is mixed with the other image elements C. Further, the label image assigning unit 32 may be configured to correspond and assign label images M to only image elements C satisfying a predetermined condition, such as image elements C greater than a predetermined size.

The displaying image output unit 33 outputs an image configured such that a label image M is assigned to the object image I (assigned image) as a displaying image Id. In detail, in this exemplary embodiment, the displaying image output unit 33 displays an assigned image in which label images M are assigned to the object image I by the label image assigning unit 32, as a displaying image Id on the image display apparatus 12 via the interface unit 24, and transmits the image to the communication destination system 2 via the communication unit 23, to display it on the image display apparatus in the communication destination system 2 as well. Thereby, the displaying image Id containing the label image M is presented to both of the users Ua and Ub.

Here, there is no need for the displaying image output unit 33 to always output the object image I assigned with the label images M as a displaying image Id during the remote meeting being held. For example, in a case in which one of plural viewers is a presenter making a presentation by use of the object image I, and the other viewers are an audience listening to the presentation, while the presenter mainly makes the presentation, there is a relatively less of a need to call names of the respective image elements C discriminately. On the other hand, when a discussion among the viewers is started due to the audience asking questions of the presenter or the like, a scene in which an attempt to speak while specifying the respective image elements C is made is brought about. Then, the displaying image output unit 33 may be configured to detect that a discussion is started among plural viewers, and output the object image I assigned with the label images M as a displaying image Id in the detected timing, and to output the object image I itself which are not assigned with label images M until a start of a discussion is detected, as a displaying image Id. Moreover, the displaying image output unit 33 may be configured to detect a termination of a discussion among plural viewers, and terminate the output of the displaying image Id assigned with the label images M in the detected timing, and to output the object image I from which the label images M are erased as a displaying image Id again.

In detail, for example, the displaying image output unit 33 specified a feature (voiceprint or the like) of a speech of a presenter in advance, and analyzes a speech signal input from the microphone 14 or a speech signal transmitted from the communication destination system 2. As a result, when the displaying image output unit 33 detects a speech of a viewer other than the presenter, the displaying image output unit 33 judges that a discussion is started, and outputs the displaying image Id assigned with the label images M. Then, when the displaying image output unit 33 receives an instruction to display a new image (for example, the following image among plural document images or slide images) as the object image I, the displaying image output unit 33 judges that a discussion is terminated, and outputs the new object image I which is not assigned with label images M. Further, in a case in which a part of the object image I greater than the display screen of the image display apparatus 12 is displayed on the display screen, when the displaying image output unit 33 receives an instruction to scroll the object image I to display a portion which has not been displayed, the displaying image output unit 33 may judge that the discussion is terminated. Moreover, when a state in which a speech of a viewer other than the presenter is not detected continues over a predetermined time, the displaying image output unit 33 may judge that the discussion is terminated.

Figure 5:
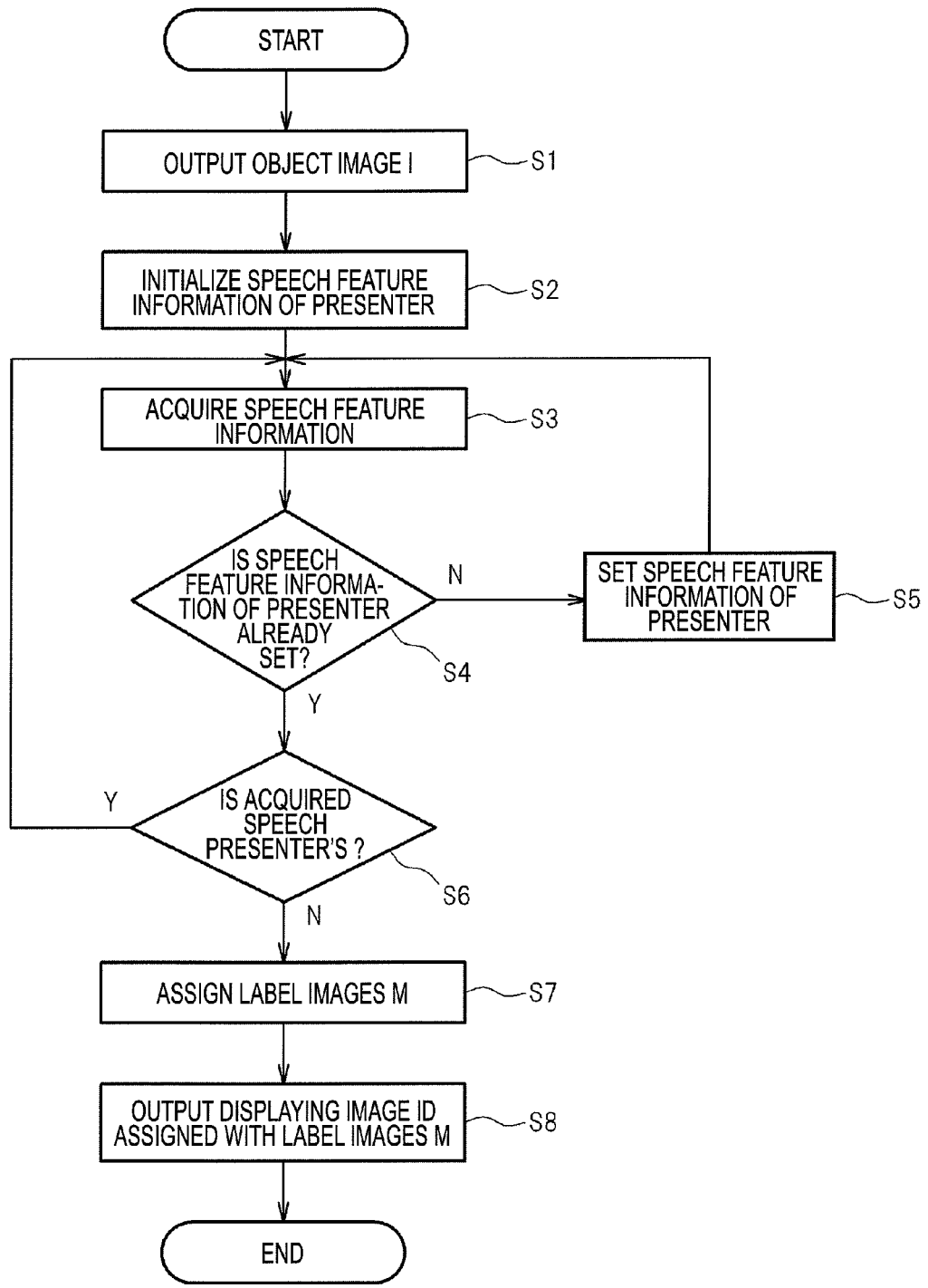
FIG. 5 is a flowchart showing an example of a processing flow executed by the image processing apparatus according to the exemplary embodiment of the invention.

Hereinafter, an example of a processing flow executed by the controller 21 of the image processing apparatus 11 when the image processing apparatus 11 detects a start of a discussion in this way, will be described with reference to a flowchart of FIG. 5.

First, the controller 21 outputs a new object image I as a displaying image Id according to an instruction from the user Ua to the operation panel 13 (S1). The displaying image Id output at this time is an image which is not assigned with label images M. Moreover, the controller 21 initializes speech feature information of a presenter to an unset state (S2).

Thereafter, the controller 21 analyzes a speech signal input from the microphone 14 or a speech signal transmitted from the communication destination system 2, and executes speaker recognition processing for specifying a feature of the voice contained therein. Thereby, speech feature information of the speaker who has spoken is acquired (S3). Next, the controller 21 judges whether or not the speech feature information of the presenter is already set (S4). Because the speech feature information of the presenter is first in an unset state by the initialization processing in S2, the controller 21 sets the speech feature information acquired in S3 as speech feature information of the presenter (S5) in accordance with a judgment result in S4. That is, a speaker who has spoken first after the object image I is displayed is regarded as a presenter, and its speech feature information is to be registered.

When the processing in S5 is completed, the process returns to S3, processing for periodically acquiring speech feature information of a speaker is repeated. Here, because the speech feature information of the speaker is already set in S5 when the processing in S3 is executed on and after the second time, in accordance with a judgment result in S4, the controller 21 judges whether or not the speech feature information newly acquired by the processing in S3 is the speech feature information of the presenter (S6). When the speech feature information newly acquired corresponds to the speech feature information of the presenter, the presenter may carry on the presentation, and therefore, the process returns to S3, and processing for periodically acquiring speech feature information of a speaker is repeated.

On the other hand, when it is judged in S6 that the speech feature information newly acquired is not the speech feature information of the presenter, a new viewer other than the presenter must have spoken. In this case, the controller 21 judges that a discussion among the viewers is started, and executes processing for assigning label images M to the object image I (S7), and outputs the object image I assigned with the label images M as a displaying image Id (S8). Thereafter, the controller 21 periodically judges whether or not a state of judging a termination of the discussion, such as an instruction to switch an image, is detected, and when it is judged that the discussion is terminated, the output of the displaying image Id assigned with the label images M is terminated.

Note that, here, assigning of label images M to the object image I is to be executed after a start of a discussion is detected. However, the label image assigning unit 32 may specify image elements C contained in the object image I at the point of time when the object image I is started to be displayed, and may execute processing for determining content and position of label images M to be assigned. Or, such processing may be executed in advance before the object image I is started to be displayed. In this way, a displaying image Id assigned with label images M is output immediately after a start of a discussion is detected.

Further, here, speech feature information first acquired after the object image I is started to be displayed is to be immediately set as speech feature information of the presenter. However, another viewer may speak first in some cases. Then, after the object image I is started to be displayed, the controller 21 may execute processing for acquiring speech feature information of a speaker over a predetermined number of times or a predetermined time, and may register most-acquired speech feature information as speech feature information of the presenter.

Note that, when the image processing apparatus 11 includes an interface for performing a modification of the object image I (a changing in the content) according to an instruction operation of the user Ua, the user Ua may carry out an operation for modifying the object image I in accordance with a discussion between the users in some cases. In detail, the operation is an operation in which the user Ua makes a pen or the like touch the display screen of the image display apparatus 12 to write characters or the like thereon, or an operation in which the user Ua directly edits electronic data of the object image I with a keyboard, a mouse, or the like. The displaying image output unit 33 may judge that a discussion is started when an operation for changing the content of the object image I is received.

Moreover, when such a modification of the object image I is carried out during the output of the displaying image Id assigned with the label images M, the label image assigning unit 32 may execute processing for assigning the label images M again in accordance with a change in the content of the object image I. In detail, when a modification is carried out such that a new image element C is added into the object image I, the label image assigning unit 32 newly assigns a label image M different from the label images M made to correspond to the other image elements, so as to correspond to the image element C to be added. Further, when a modification is carried out such that an image element C is deleted from the object image I, the label image M made to correspond to the image element C as well is deleted. Thereby, even if the content of the object image I is changed, a state in which a label image M for holding a discussion on an image element C contained in the changed object image I is displayed, is retained.

Further, when a modification is carried out such that a new image element C is further added into the object image I after the label image M made to correspond to the image element C is deleted in accordance with the modification of deleting the image element C, the label image assigning unit 32 may be configured to assign a label image M different from, not only the other label images M currently assigned, but also the label image M deleted in the past, so as to correspond to the image element C to be added.

As a specific example, as shown in FIG. 4, it is assumed that three image elements C1 to C3 and three label images M1 to M3 corresponding thereto are contained in one object image I, and thereafter, the image element C2 is deleted according to an instruction from the user Ua. At this time, the label image M2 made to correspond to the image element C2 as well is deleted. Thereafter, when an image element C4 is newly added, not the already deleted label image M2 containing the numeral 2, but the label image M4 containing, for example, the numeral 4 is assigned so as to correspond to the image element 4. In this way, the respective image elements C contained in the object image I including the already deleted image element C are discriminated by the label images M.

Figure 6:
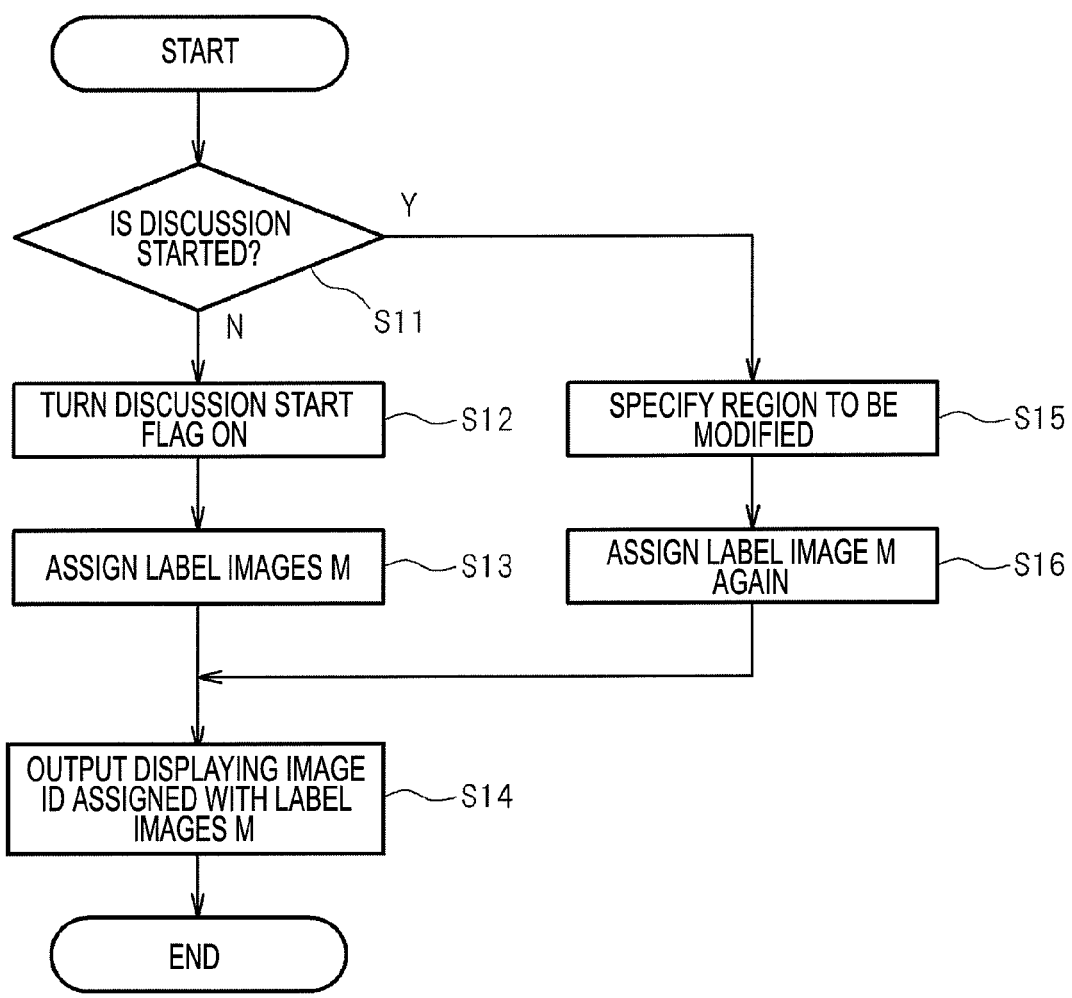
FIG. 6 is a flowchart showing another example of a processing flow executed by the image processing apparatus according to the exemplary embodiment of the invention.

Hereinafter, an example of a processing flow executed by the controller 21 when an instruction to modify the object image I is received will be described with reference to a flowchart of FIG. 6.

First, the controller 21 judges whether or not a start of a discussion is already detected at the point of time when the modification instruction is received (S11). This judgment is carried out with reference to a discussion start flag stored in the memory 22, for example.

When a start of a discussion is not detected, the controller 21 regards the modification instruction as a start of a discussion, and updates the discussion start flag to be ON (S12). Then, the controller 21 executes processing for assigning label images M to the object image I in the same way as in S7 described above (S13), and outputs the object image I assigned with the label images M as a displaying image Id (S14).

On the other hand, when it is judged in S11 that a start of a discussion is already detected, the controller 21 must be in the process of outputting the displaying image Id assigned with the label images M at this point in time. In this case, the controller 21 specifies a region in the object image I to be modified according to the received modification instruction (S15). Then, the controller 21 analyzes an image element C overlapping on the specified region, and assigns a label image M again (S16). In detail, the controller 21 adds a label image M corresponding to a newly added image element C, deletes a label image M corresponding to a deleted image element C, or updates a position of a label image M corresponding to an image element C changed in position. Then, the controller 21 outputs the object image I assigned with the label images M by the processing in S16, as a displaying image Id (S14).

Note that, in the above description, the image processing apparatus 11 is configured to generate the displaying image Id assigned with the label images M to transmit the displaying image Id to the communication destination system 2. However, the exemplary embodiment of the invention is not limited to such a configuration. For example, the image processing apparatus 11 assigns label images M to the object image I, to output it as a displaying image Id to the image display apparatus 12. On the other hand, the image processing apparatus 11 may be configured to transmit the object image I itself to the communication destination system 2. In this case, in order to share the object image I assigned with the same label images M between the site A and the site B, processing for assigning label images M to the object image I received from the image processing apparatus 11 is executed in the communication destination system 2 as well. At this time, the image processing apparatus 11 may be configured to instruct the timing to start assigning the label images M to the communication destination system 2, or the timing to terminate the output of the displaying image Id assigned with the label images M. Moreover, the image processing apparatus 11 may be configured to transmit, not only such information on timing, but also information for designating the content and the position of the label images M to be assigned to the object image I, to the communication destination system 2.

Further, in the above description, the example in which the label images M are assigned to the object image I to be shared between the remote places has been described. However, the invention is not limited to this example, and the image processing apparatus 11 may be configured to output the displaying image Id assigned with the label images M to an image display apparatus such as a projector. Thereby, with respect to the object image I viewed by plural viewers at one site, at the time of holding a discussion on the object image I, label images M are assigned to the image elements C contained in the object image I.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
   a label image assigning unit that respectively assigns label images to image elements contained in an object image, wherein the assigned label images correspond to positions of the respective image elements in the object image, the object image acquired as an object to be viewed by a plurality of viewers; and
   a displaying image output unit that outputs an assigned image which is the object image with the label images as a displaying image,
   wherein when a first image element is added into the object image, the label image assigning unit assigns a first label image different from the label images made to correspond to the image elements, so as to correspond to the added first image element,
   wherein when a second image element is deleted from the object image, the label image assigning unit deletes a second label image made to correspond to the second image element, and
   the first label image assigned so as to correspond to the added first image element is different from the label images made to correspond to the image elements including the deleted second label image.

2. The image processing system according to claim 1, wherein when the object image is an image denoting a document, the label image assigning unit specifies image elements to make the label images correspond thereto based on a result of a structural analysis on the document.

3. The image processing system according to claim 1, further comprising:
   a display that displays an image so as to allow a plurality of viewers to view the image, wherein the display displays the assigned image in timing when a start of a discussion among the plurality of viewers is detected.

4. The image processing system according to claim 3, wherein the display of the assigned image is terminated in timing when a termination of the discussion among the plurality of viewers is detected.

5. An image processing method comprising:
   respectively assigning label images to image elements contained in an object image, wherein the assigned label images correspond to positions of the respective image elements in the object image, the object image acquired as an object to be viewed by a plurality of viewers;
   outputting an assigned image which is the object image with the label images as a displaying image;
   assigning, when a first image element is added into the object image, a first label image different from the label images made to correspond to the image elements, so as to correspond to the added first image element; and
   deleting, when a second image element is deleted from the object image, a second label image made to correspond to the second image element,
   wherein the first label image assigned so as to correspond to the added first image element is different from the label images made to correspond to the image elements including the deleted second label image.

6. A non-transitory computer readable medium storing a program causing a computer to execute a process for image processing, the process comprising:
   respectively assigning label images to image elements contained in an object image, wherein the assigned label images correspond to positions of the respective image elements in the object image, the object image acquired as an object to be viewed by a plurality of viewers;
   outputting an assigned image which is the object image with the label images as a displaying image;
   assigning, when a first image element is added into the object image, a first label image different from the label images made to correspond to the image elements, so as to correspond to the added first image element; and deleting, when a second image element is deleted from the object image, a second label image made to correspond to the second image element, wherein the first label image assigned so as to correspond to the added first image element is different from the label images made to correspond to the image elements including the deleted second label image.

7. The image processing system of claim 1, wherein the assigned label images comprise address terms respectively corresponding to the image elements in the object image.

8. The image processing method of claim 5, wherein the assigned label images comprise address terms respectively corresponding to the image elements in the object image.

9. The non-transitory computer readable medium of claim 6, wherein the assigned label images comprise address terms respectively corresponding to the image elements in the object image.

10. An image processing system comprising:

a label image assigning unit that respectively assigns label images, each label image corresponding to each of address terms of image elements, to each position corresponding to each of the image elements in an object image, with respect to each of the image elements contained in the object image, the object image acquired as an object to be viewed by a plurality of viewers; and an image output unit that outputs an assigned image in which the label images are assigned to the object image, wherein when a first image element is added into the object image, the label image assigning unit assigns a first label image different from the label images made to correspond to the image elements, so as to correspond to the added first image element, wherein when a second image element is deleted from the object image, the label image assigning unit deletes a second label image made to correspond to the second image element, and the first label image assigned so as to correspond to the added first image element is different from the label images made to correspond to the image elements including the deleted second label image.

11. The image processing system according to claim 10, wherein when the object image is an image denoting a document, the label image assigning unit specifies image elements to make the label images correspond thereto based on a result of a structural analysis on the document.

12. The image processing system according to claim 10, further comprising:

a display that displays an image so as to allow a plurality of viewers to view the image, wherein the display displays the assigned image in timing when a start of a discussion among the plurality of viewers is detected.

13. The image processing system according to claim 12, wherein the display of the assigned image is terminated in timing when a termination of the discussion among the plurality of viewers is detected.

14. An image processing method comprising:

respectively assigning label images, each label image corresponding to each of address terms of image elements, to each position corresponding to each of the image elements in an object image, with respect to each of the image elements contained in the object image, the object image acquired as an object to be viewed by a plurality of viewers; and outputting an assigned image in which the label images are assigned to the object image, wherein when a first image element is added into the object image, the respectively assigning label images comprises assigning a first label image different from the label images made to correspond to the image elements, so as to correspond to the added first image element, wherein when a second image element is deleted from the object image, the image processing method further comprises deleting a second label image made to correspond to the second image element, and the first label image assigned so as to correspond to the added first image element is different from the label images made to correspond to the image elements including the deleted second label image.

15. A non-transitory computer readable medium storing a program causing a computer to execute a process for image processing, the process comprising:

respectively assigning label images, each label image corresponding to each of address terms of image elements, to each position corresponding to each of the image elements in an object image, with respect to each of the image elements contained in the object image, the object image acquired as an object to be viewed by a plurality of viewers; and outputting an assigned image in which the label images are assigned to the object image, wherein when a first image element is added into the object image, the respectively assigning label images comprises assigning a first label image different from the label images made to correspond to the image elements, so as to correspond to the added first image element, wherein when a second image element is deleted from the object image, the process further comprises deleting a second label image made to correspond to the second image element, and the first label image assigned so as to correspond to the added first image element is different from the label images made to correspond to the image elements including the deleted second label image.

* * * * *